United States Patent
Kitano et al.

[11] Patent Number: 5,560,691
[45] Date of Patent: Oct. 1, 1996

[54] METHOD AND APPARATUS FOR ANTI-SKID CONTROL

[75] Inventors: Yutaka Kitano, Tokyo; Masaru Sakuma; Toshio Takayama, both of Yamanashi-ken, all of Japan

[73] Assignee: Tokico Ltd., Kanagawa-ken, Japan

[21] Appl. No.: 526,918

[22] Filed: Sep. 12, 1995

[30] Foreign Application Priority Data

Sep. 16, 1994 [JP] Japan .................................. 6-222256

[51] Int. Cl.⁶ .................................................. B60T 8/00
[52] U.S. Cl. .......................................... 303/158; 303/156
[58] Field of Search ..................................... 303/158, 153, 303/150, 155, 164, 163, 156; 364/426.01, 426.02

[56] References Cited

U.S. PATENT DOCUMENTS

| 3,888,550 | 6/1975 | Reinecke et al. | 303/158 |
| 4,033,634 | 7/1977 | Arai et al. | 303/158 |
| 5,071,200 | 12/1991 | McNinch, Jr. | 303/158 |

*Primary Examiner*—Robert J. Oberleitner
*Assistant Examiner*—Peter M. Poon
*Attorney, Agent, or Firm*—Wenderoth, Lind & Ponack

[57] ABSTRACT

In the disclosed method and apparatus, the brake fluid pressure in a wheel cylinder is reduced and thereafter it is re-increased so that the braking torque is linearly increased with respect to time due to the anti-skid control and the rate of change of the coefficient of road surface friction with respect to the wheel slip rate is determined while the brake fluid pressure is thus re-increased so that the brake fluid pressure is re-relieved when said rate of change comes below a predetermined threshold. The method of invention calculates the rate of change by achieving, when there is no pulsatory change in the wheel speed during the re-increase of the brake fluid pressure the steps of: obtaining the wheel speed at the point of time which is the midpoint of first and second points of time giving the same wheel speed, subtracting from this wheel speed at the midpoint the wheel speed at the first point of time or at the second point of time, increasing by four times the result of subtraction and dividing this increased result by the time period between the first and second points of time, obtaining a reciprocal of the result of the division, subtracting from this reciprocal, a reciprocal of the wheel acceleration at the first point of time, multiplying the result of the subtraction with the vehicle speed and a value which is attained by dividing the rate of increase of the braking torque at the midpoint by the product of the wheel load and the effective wheel radius, and then increasing the result of the multiplication by three times.

2 Claims, 3 Drawing Sheets

METHOD AND APPARATUS FOR ANTI-SKID CONTROL

BACKGROUND OF THE INVENTION

This invention relates to a method and an apparatus for anti-skid control in which wheels are prevented from being locked upon being braked.

In a known apparatus for anti-skid control for preventing wheels from being locked upon being braked, while an anti-skid control is effected, a modulator reduces the brake fluid pressure in a wheel cylinder and thereafter increases it again under certain conditions so that the braking torque (total braking torque including braking system torque) is increased linearly with respect to time. In this pressure re-increase state, the anti-skid control is achieved in the following manner for example. When it is determined from the information given by a wheel speed detector that the wheel acceleration exceeds a predetermined threshold in a zone where the wheel speed is decreasing, it is assumed that the rate of change k of the coefficient of road surface friction with respect to the wheel slip rate is in a range giving a stable braking condition represented by k>0 and the pressure re-increase state by means of the modulator is maintained. When the rate of change k comes below the threshold, it is judged that the rate of change is in a range giving an unstable braking condition represented by k<0 and the brake fluid pressure is reduced by the modulator.

In this specification, the term "braking torque" means a total torque to effect braking of a wheel including a brake torque created by a braking system and a torque created by the engine-brake effect and the like. The term "braking system torque" means a torque created by a braking system.

Incidentally, the inventors have invented a method for calculating the rate of change k from the wheel speed detected at four points and other factors as an improvement of the anti-skid control apparatus noted above. The improved method has been applied for a patent in Japan and it has been disclosed in Japanese Patent Public Disclosure No. 7-81542.

In the prior art method disclosed in this Japanese Patent Public Disclosure, since the rate of change k of the coefficient of road surface friction with respect to the wheel slip rate must be calculated from values of the wheel speed detected at four points, the process time for the calculation is relatively long and therefore, there is a need for further improvement.

SUMMARY OF THE INVENTION

An object of the invention is to provide an anti-skid control method and an apparatus using the method by which the process time for calculation is further shortened when it is determined whether the system is stable or unstable by the rate of change k of the coefficient of road surface friction with respect to the wheel slip rate.

In order to achieve the object noted above, the present invention provides a method of anti-skid control in which when an anti-skid control is achieved, the brake fluid pressure in a wheel cylinder is reduced and thereafter it is re-increased so that the braking torque is linearly increased with respect to time. The rate of change of the coefficient of road surface friction with respect to the wheel slip rate is observed while the brake fluid pressure is thus re-increased so that the brake fluid pressure is re-relieved when said rate of change comes below a predetermined threshold. The method calculates the above-noted rate of change by achieving, when there is no pulsatory change in the wheel speed during the re-increase of the brake fluid pressure, the steps of: obtaining the wheel speed at the point of time which is the midpoint of first and second points of time giving the same wheel speed, subtracting from this wheel speed at the midpoint the wheel speed at the first point of time or at the second point of time, increasing by four times the result of subtraction and dividing this increased result by the time period between the first and second points of time, obtaining a reciprocal of the result of the division, subtracting from this reciprocal, a reciprocal of the wheel acceleration at the first point of time, multiplying the result of the subtraction with the vehicle speed and a value which is attained by dividing the rate of increase of the braking torque at the midpoint by the product of the wheel load and the effective wheel radius, and then increasing the result of the multiplication by three times.

The invention also provides an apparatus for anti-skid control comprising a wheel speed detector for detecting the speed of a wheel, a modulator which can at least decrease or increase the brake fluid pressure in a wheel cylinder and a controller for controlling the operation of the modulator. The controller is adapted, by means of the modulator, when an anti-skid control is achieved, to reduce the brake fluid pressure in the wheel cylinder and thereafter re-increase it under predetermined conditions so that the brake torque is increased linearly with respect to time and also adapted to calculate the rate of change of the coefficient of road surface friction with respect to the wheel slip rate by achieving, while the brake fluid is thus increased and when it is judged that there is no pulsatory change in the wheel speed, the steps of: obtaining the wheel speed at the point of time which is the midpoint of first and second points of time giving the same wheel speed, subtracting from this wheel speed at the midpoint the wheel speed at the first point of time or at the second point of time, increasing by four times the result of subtraction and dividing this increased result by the time period between the first and second points of time, obtaining a reciprocal of the result of the division, subtracting from this reciprocal, a reciprocal of the wheel acceleration at the first point of time, multiplying the result of the subtraction with the vehicle speed and a value which is attained by dividing the rate of increase of the braking torque at the midpoint by the product of the wheel load and the effective wheel radius, and then increasing the result of the multiplication by three times, so that when the above-noted rate of change comes below a predetermined threshold, the braking pressure is re-relieved by the modulator.

The invention will be described in more detail with reference to the drawings.

DETAILED DESCRIPTION OF THE INVENTION

A method of anti-skid control according to one embodiment of the invention will be described with reference to the drawings.

Figure 1:
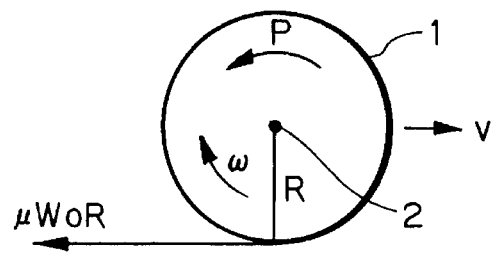
FIG. 1 is a schematic illustration for showing a movement of a vehicle wheel for which a control according to one embodiment of the invention is applied.

In the following description, as schematically shown in FIG. 1, the load applied to a wheel 1 is designated by Wo, the effective radius of the wheel 1 by R, the angular velocity of the wheel by $\omega$, the differential coefficient of the angular velocity by $\omega'$, the moment of inertia about the axle 2 of the wheel by I, the torque applied to the axle 2 by P and the coefficient of road surface friction acting between the wheel 1 and a road surface by $\mu$. The load Wo may be represented, for example, by a standard local load applied to a wheel in question which is determined by the weight of a vehicle or by other similar values. For the radius R, a standard value for the effective radius of wheels may be used.

Figure 2:
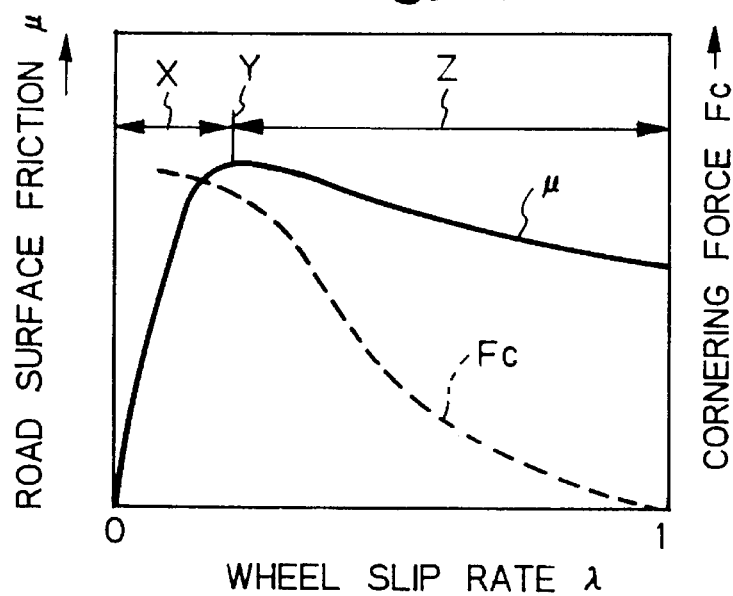
FIG. 2 is a graph showing a relationship among the slip rate of the wheel, the coefficient of road surface friction and the cornering force.

Generally, the relationship between the wheel slip rate $\lambda$ and the coefficient of road surface friction $\mu$ is such as shown in FIG. 2 in which the rate of change k expressed by $k=d\mu/d\lambda$ changes as follows:

k>0 in the zone designated by X
k=0 at the point designated by Y and
k<0 in the zone designated by Z.

In these expressions, the wheel slip rate $\lambda$ is attained by the following equation:

$$\lambda = 1 - R\omega/v,$$

wherein $R\omega$ means a wheel speed which is determined by a signal given by a wheel speed detector (described later) and v is an imaginary vehicle speed deduced from the wheel speed and other factors.

When the conditions are in the zone X where the slip rate $\lambda$ is smaller than that at the point Y where k=0, it is determined that the system is in a stable braking state in which wheel lock never happens. On the other hand, when the conditions are in the zone Z where the slip rate $\lambda$ is greater than that at the point Y, it is determined that the system is in an unstable braking state in which the cornering force represented by the broken line Fc in FIG. 2 is lowered and the wheel lock is liable to take place.

Figure 3:
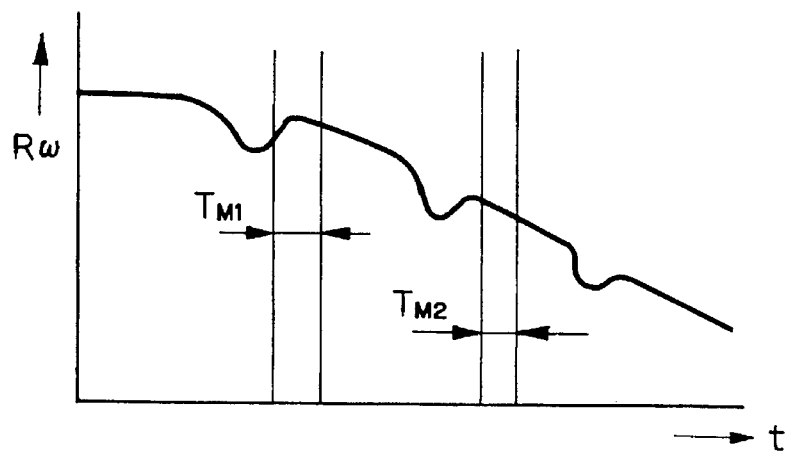
FIG. 3 is a graph showing a relationship between time and the wheel speed when the anti-skid control according to the embodiment is effected.

While the anti-skid control is achieved, the relationship between the time and the wheel speed $R\omega$ is of such characteristics as shown in FIG. 3. This embodiment is a method for calculating the rate of change k which is used to make a judgement in the process of controlling a timing for re-relieving of the braking pressure in the zone TM1. This zone TM1 is the zone in which the wheel 1 changes from an accelerating state to a decelerating state in such a condition that there is no pulsatory change in the wheel speed when, during the anti-skid control, the pressure of the brake fluid in a wheel cylinder is reduced and thereafter re-increased so that the braking torque including the braking system torque is linearly increased with respect to time. Control of other items, such as the timing at which the reduction of pressure is started in an early stage of the braking operation, the timing at which the operation mode is changed from a pressure relieving state to a pressure re-increase state and the timing at which a pressure re-relieving is achieved in a zone TM2 in which the wheel is consistently decelerating is performed in a conventional method.

Where the load applied to the wheel is represented by Wo, the effective radius of the wheel by R, the angular velocity of the wheel by $\omega$, the differential coefficient of the angular velocity by $\omega'$, the moment of inertial about the axle by I, the torque applied to the axle by P and the gravitational acceleration by g as noted above, the following expression is attained.

$$R\omega' = (g/Co)\{\mu - P/(WoR)\} \quad (1)$$

where $Co=1/(WoR^2/g)$.

At certain time tn, the following expression is attained.

$$R\omega'n = (g/Co)[\mu n - \{P/(WoR)\}n] \quad (2)$$

The relationship among the slip rate of the wheel $\lambda$, the wheel speed $R\omega$ and the vehicle speed v is expressed by the following equation.

$$\lambda = 1 - (R\omega/v) \quad (3)$$

By differentiating both sides of equation (3) with respect to time while considering the vehicle speed v to be constant, the following is obtained.

$$\lambda' = -(R\omega'/v) \quad (4)$$

The rate of change k which represents the rate of change of the coefficient of road surface friction $\mu$ with respect to the wheel slip rate $\lambda$ is expressed by the following as understood by its definition.

$$k = \mu'/\lambda' \quad (5)$$

From equations (4) and (5), the following is obtained.

$$\mu' = -(k/v)R\omega' \quad (6)$$

FIG. 4 shows the wheel speed $R\omega$, the coefficient of road surface friction $\mu$ and the braking torque P/(WoR) in the zone TM1 shown in FIG. 3. This zone TM1 is a zone in which the wheel speed changes from an acceleration state to a deceleration state when the brake fluid pressure is relieved and then the braking torque is increased linearly with respect to time with the rate of increase Q of the braking torque under an anti-skid control. This zone TM1 can be determined by a signal from the wheel speed detector. The characteristics of the relationship between $\mu$ and $\lambda$, and the values of k, v, Wo and Co are assumed to be constant.

Figure 4A:
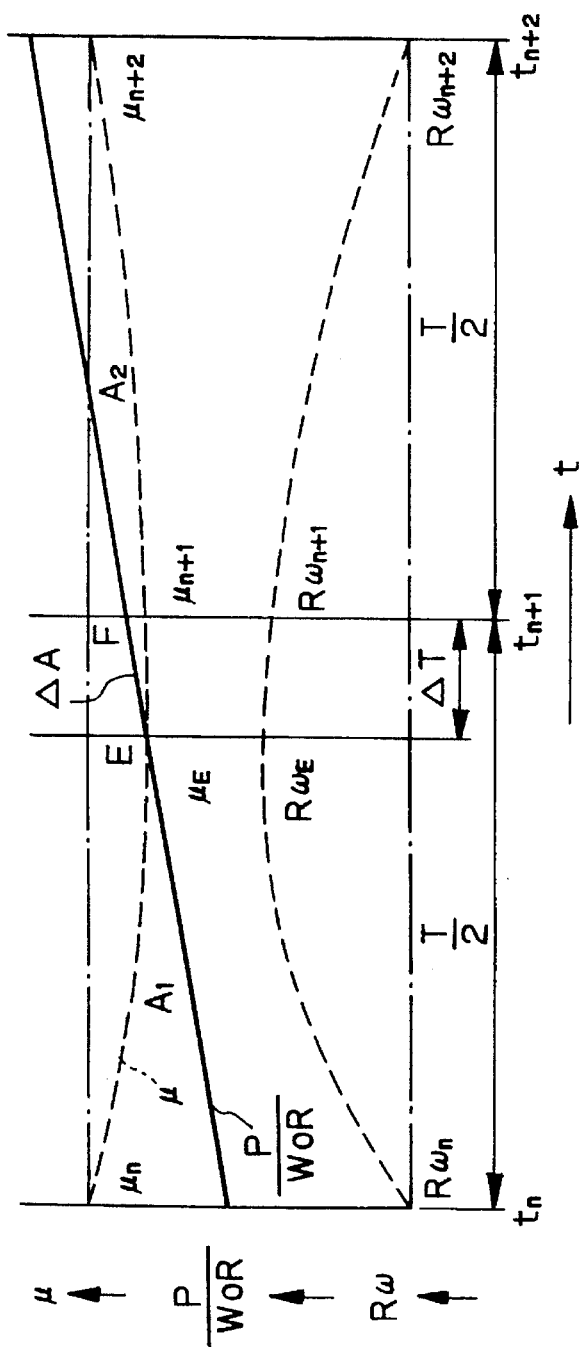
FIG. 4A shows a relationship among the wheel speed $R\omega$, the coefficient of road surface friction $\mu$ and the braking torque $P/(WoR)$ under a control method according to the embodiment of the invention in a zone in which the wheel speed changes from the acceleration state to the deceleration state and when there is no pulsation in the wheel speed.

In FIG. 4A, the coefficient of road surface friction $\mu$ and the braking torque P/(WoR) in the parentheses [] in equation (2) are shown as values of dimensionless quantity. In the condition where $\mu > P/(WoR)$, the wheel is accelerated and in the condition where $\mu < P/(WoR)$, the wheel is decelerated.

The wheel speed is detected in every time period of a predetermined value T/2 so that the condition $R\omega n = R\omega n_{+2}$ is attained where the wheel speed is $R\omega n$ at time tn, $R\omega n+1$ at time $tn_{+1}$ and $R\omega n_{+2}$ at time $tn_{+2}$.

In FIG. 4A, the relationship between the coefficient of road surface friction $\mu n$ at time tn and the coefficient of road surface friction $\mu n_{+2}$ at time $tn_{+2}$ is such that the areas A1 and A2 respectively defined between the lines of $\mu$ and P/(WoR) are the same since $R\omega n = R\omega n_{+2}$.

First, the area A1 is obtained as follows.

The point E corresponding to the maximum wheel speed $R\omega_E$ is considered to be an origin of a coordinate system and the axis $x_1$ is drawn on the left of the origin. The curve $(\mu_E \sim \mu n)$ is represented by $y_1$ and the curve $y_1$ is represented by approximation by the following quadratic curve.

$$y_1 \approx \{(\mu_n - \mu_E)/(T/2 - \Delta T)^2\} x_1^2$$

Therefore, the area A1 is given by the following expression, where $a = T/2 - \Delta T$.

$$A = \int_0^a \{(\mu_n - \mu_E)(x_1/a)^2 + (Q/(WoR))x_1\} dx_1 \quad (7)$$
$$= (1/3)(\mu_n - \mu_E)a + (1/2)(Q/(WoR))a^2$$

Figure 4B:
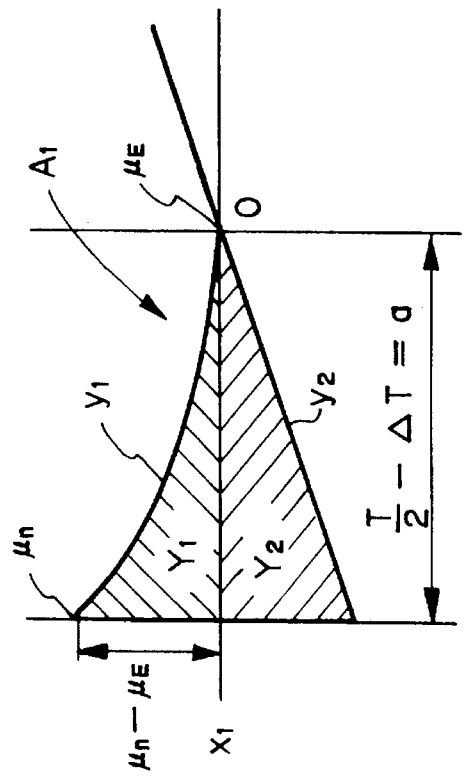
FIG. 4B shows a portion of FIG. 4A for assisting understanding of the process for obtaining area A1.

This expression will be explained in more detail with reference to FIG. 4B. In FIG. 4B, the area A1 is a sum of subsections $Y_1$ and $Y_2$.

$$y_1 = \alpha x_1^2$$

where, $\alpha a^2 = \mu_n - \mu_E$.
Therefore, $$\alpha = (\mu_n - \mu_E)/a^2.$$

Therefore, $$y_1 = \{(\mu_n - \mu_E)/a^2\} x_1^2$$

On the other hand, $$y_2 = (Q/WoR) x_1.$$

As a result, $$Y_1 + Y_2 = \int_0^a [\{(\mu_n - \mu_E)/a^2\} x_1^2 + (Q/WoR) x_1] dx_1$$
$$= [\{(\mu_n - \mu_E)/3a^2\} x_1^3 + (Q/2WoR) x_1^2]_0^a$$
$$= (1/3)(\mu_n - \mu_E)a + (1/2)(Q/Wor)a^2$$

In this expression, Q/(WoR) is the rate of increase of the braking torque between the range $(tn \sim tn_{+1})$ divided by the product of the wheel load and the effective wheel radius. In this embodiment, the value Q is represented by the rate of increase of the braking torque which depends on the rate of increase of pressure in a wheel cylinder. The latter is determined by the characteristics of a pump, the wheel cylinder and the hydraulic fluid transmission line connecting them.

Next, the area A2 is obtained by the following steps.

The point E is considered to be an origin of a coordinate system and the axis $x_2$ is drawn on the right of the origin. The curve $(\mu_E \sim \mu n_{+2})$ is represented by $y_2$ and the curve $y_2$ is represented by approximation by the following expression.

$$Y_2 \approx \{(\mu n - \mu_E)/(T/2 + \Delta T)^2\} x_2^2$$

Therefore, the area A2 is given by the following expression, where $b = T/2 - \Delta T$.

$$A_2 = \int_0^b \{(Q/(WoR))x_2 - (\mu_n - \mu_E)(x_2/b)^2\} dx_2 \quad (8)$$
$$= (1/2)(Q/(WoR))b^2 - (1/3)(\mu_n - \mu_E)b$$

Since the areas are in this relation, A1=A2, $$(1/3)(\mu n - \mu_E)(T/2 - \Delta T) + (1/2)(Q/WoR)(T/2 - \Delta T)^2 \approx -(1/3)(\mu n - \mu_E)(T/$$

$$2 + \Delta T) + (1/2)(Q/(WoR))(T/2 + \Delta T)^2.$$

Therefore, $$(2/3)(\mu n - \mu_E)(T/2) \approx 2(Q/(WoR))(T/2)\Delta T.$$

Consequently, $$(\mu n - \mu_E) \approx 3(Q/(WoR))\Delta T. \quad (9)$$

Using the equation (9), the area A1 is determine by the following.

$$\text{Area } A_1 \approx (Q/(WoR))\Delta T(T/2 - \Delta T) + (1/2)(Q/(WoR))(T/2 - \Delta T)^2 \approx (1/2)(Q/(WoR))(T/2)^2 \{1 - (\Delta T/(T/2))^2\} \quad (10)$$

The area $\Delta A$ surrounded by E, F and $\mu n_{+1}$ is obtained as follows when the area is regarded as a triangular shape by approximation.

$$\text{Area } \Delta A \approx (1/2)(Q/(WoR))(\Delta T)^2 = (1/2)(Q/(WoR))(T/2)^2(\Delta T/(T/2))^2$$

Therefore, $$(R\omega n_{+1} - R\omega n) = (g/C)(A_1 - \Delta A) \approx (1/2)(g/C)(Q/(WoR))(T/2)^2\{1 - 2(\Delta T/(T/2))^2\}. \quad (11)$$

When the equation (9) is used, the following relationship is obvious from FIG. 4.

$$R\omega n' = (g/C)\{(Q/(WoR))(T/2 - \Delta T) + (\mu n - \mu_E)\} \quad (12)$$
$$\approx (g/C)(Q/(WoR))(T/2 + 2\Delta T)$$
$$= (g/C)(Q/(WoR))(T/2)\{1 + 2\Delta T/(T/2)\}$$

From both expressions (11) and (12), $$\{2(R\omega n_{+1} - R\omega n)/(T/2)\}/R\omega n' \approx \{1 - 2(\Delta T/(T/2))^2\}/\{1 + 2\Delta T/(T/2)\}$$
$$= 1 - 2(\Delta T/(T/2))\{1 + \Delta T/(T/2)\}/\{1 + 2\Delta T/(T/2)\}.$$

Therefore, $$1 - \{2(R\omega n_{+1} - R\omega n)/(T/2)\}/R\omega n' = 2(\Delta T/(T/2))\{1 + \Delta T/(T/2)\}/\{1 + 2\Delta T/(T/2)\}. \quad (13)$$

On the other hand, $$(R\omega n_{+1} - R\omega n) = (v/k)(\mu n - \mu n_{+1}) \quad (14)$$
$$= (v/k)\{(\mu n - \mu_E) - (\mu n_{+1} - \mu_E)\}$$
$$= (v/k)(\mu n - \mu_E)\{1 - \Delta A/A_1\}$$
$$\approx (v/k)3(Q/(WoR))\Delta T[1 - (\Delta T/(T/2))^2/\{1 - (\Delta T/(T/2))^2\}].$$

Therefore, $$\Delta T/(T/2) \approx (k/v)(1/3)(1/(Q/(WoR))\{(R\omega n_{+1} - R\omega n)/(T/2)\} \times \{1 - (\Delta T/(T/2))^2\}/\{1 - 2(\Delta T/(T/2))^2\}.$$

Making substitution of this in expression (13), the following is obtained.

$$1 - \{2(R\omega n_{+1} - R\omega n)/(T/2)\}R\omega n' \approx \quad (15)$$
$$\{(k/v)(1/3)(1/(Q/(WoR)))\}\{2(R\omega n_{+1} - R\omega n)/(T/2)\} \times$$

-continued $$[\{1 + \Delta T/(T/2)\}\{1 - (\Delta T/(T/2))^2\}]/$$

$$\{1 + 2\Delta T/(T/2)\}\{1 - 2(\Delta T/(T/2))^2\}]$$

Since the term in the parentheses [] in the right side of expression (15) approximates one, $$1-\{2(R\omega n_{+1}-R\omega n)/(T/2)\}/R\omega n' \approx \{(k/v)(1/3)(1/(Q/(WoR)))\}\{2(R\omega n_{+1}-R\omega n)/(T/2)\}.$$

Therefore, $$k \approx 3v(Q/(WoR))[1/(\{2(R\omega n_{+1}-R\omega n)/(T/2)\}-1/R\omega n'] \quad (16)$$

$$= 3v(Q/(WoR))[1/\{4(R\omega n_{+1}-R\omega n)/T\}-1/R\omega n'] \quad (17)$$

Since $R\omega n = R\omega n+2$, k can also be expressed by, $$k \approx 3v(Q/(WoR)). \quad (18)$$

In summary, the rate of change k of the coefficient of road surface friction with respect to the slip rate of the wheel is calculated by the steps of: obtaining the wheel speed $R\omega n+1$ at a point of time $tn_{+1}$ which is the midpoint of a first point of time tn and the second point of time $tn_{+2}$ giving the same wheel speed, subtracting from this wheel speed $R\omega n_{+1}$ the wheel speed $R\omega n$ at the first point of time tn or $R\omega n_{+2}$ at the second point of time $tn_{+2}$, increasing by four times the result of subtraction ($R\omega n_{+1}-R\omega n$) or ($R\omega n_{+1}-R\omega n_{+2}$) and dividing this increased result by the time period T between the first and second points of time tn and $tn_{+2}$, obtaining a reciprocal of the result of the division, subtracting from this reciprocal, a reciprocal of the wheel acceleration $R\omega n'$ at the first point of time tn, multiplying the result of subtraction with Q/(WoR) and the vehicle speed v, the former being attained by dividing the rate of increase Q of the braking torque at the midpoint $tn_{+1}$ by the product of the wheel load Wo and the effective wheel radius R, and then the result of the multiplication is increased by three times.

In this embodiment, when the rate of change k obtained by equation (17) or (18) comes below a predetermined threshold (zero for example), the control for starting pressure relief after the pressure re-increase in the anti-skid control is achieved.

An anti-skid control in which the foregoing calculation method is used will be described.

Figure 5:
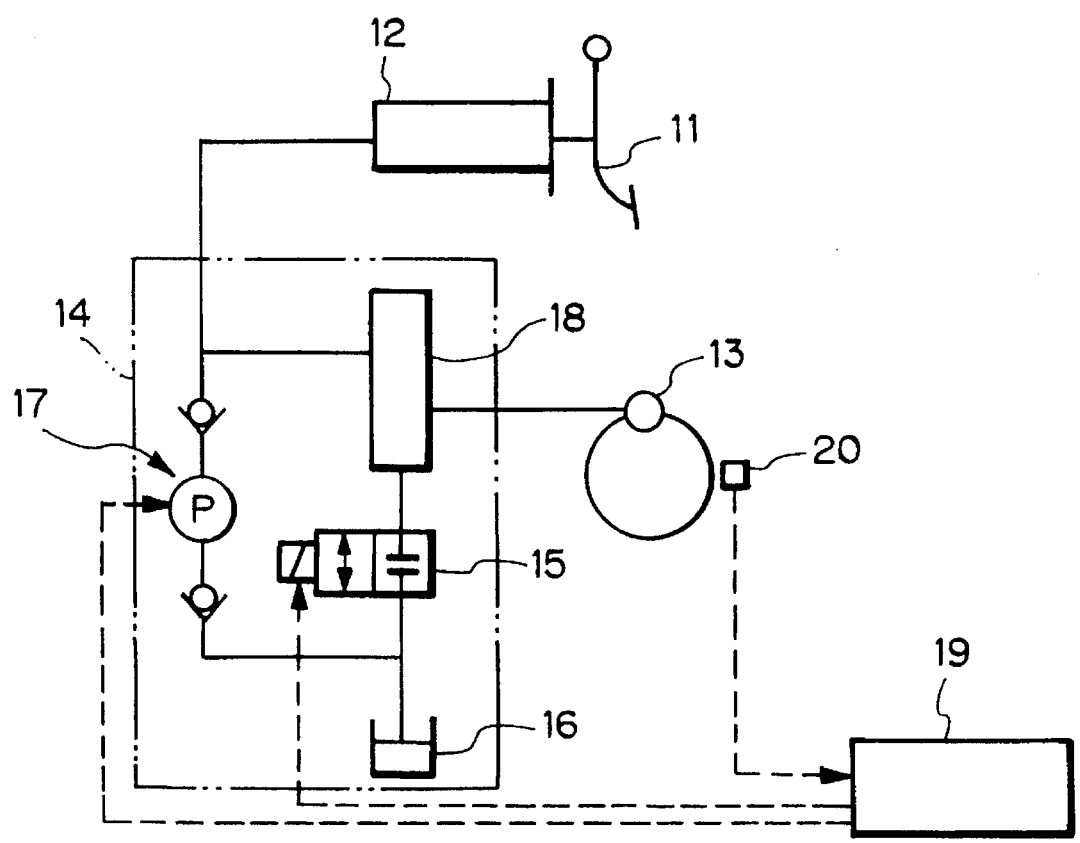
FIG. 5 is a schematic illustration of an anti-skid control apparatus according to an embodiment of the invention.

FIG. 5 shows a brake fluid system which employs an anti-skid control for a vehicle. The system comprises a master cylinder 12 which creates brake fluid pressure by the operation of a brake pedal 11, a wheel cylinder 13 for braking a wheel 1 by the fluid pressure transmitted from the master cylinder and a modulator 14 therebetween. The wheel cylinder 13 is a hydraulic actuator used in disc brakes, drum brakes or the like.

The modulator 14 comprises a normally closed electromagnetic valve 15, a reservoir of a variable capacity 16, a pump 17 for sucking a brake fluid from the reservoir 16 and pumping the same and a flow control valve 18. The flow control valve 18 operates in the following way. When the anti-skid control does not takes place and the normally closed electromagnetic valve 15 is closed, it establishes communication between the master cylinder 12 and the wheel cylinder 13. While the anti-skid control is in a pressure relieving state, in cooperation with the normally closed electromagnetic valve being electrically energized to open, the flow control valve 18 blocks the communication between the master cylinder 12 and the wheel cylinder 13 and at the same time establishes communication between the wheel cylinder 13 and the reservoir 16 to allow the brake fluid in the wheel cylinder 13 to be discharged to the reservoir 16. When the anti-skid control is in a pressure re-increase state and the normally closed electromagnetic valve 15 is closed, the brake fluid pumped from the reservoir 16 by the pump 17 is supplied to the wheel cylinder 13 at a constant rate per hour so that the rate of increase of the braking torque is kept constant.

In the brake pressure relieving state in the anti-skid control, the brake fluid discharged to the reservoir 16 is returned to the master cylinder side by the pump 18.

The normally closed electromagnetic valve 15 and the pump 17 are connected to a controller 19. To the controller, a wheel speed detector 20 for detecting the rate of rotation of the wheel 1 to outputs pulses depending on the rate of rotation is connected.

In connection with a judgement for start of anti-skid control (start of initial pressure relieving), conventional methods may be used. For example, the slip rate or a quantity of the wheel slip with respect to the imaginary vehicle speed is calculated based on the output from the wheel speed detector 20 and when the slip rate or the quantity of the slip exceeds a predetermined threshold, it is judged that the wheel tends to be locked and the anti-skid control is started. Alternatively, anti-skid control may be started by another conventional method for judgement of start of control in which when the deceleration of the wheel exceeds a predetermined threshold, it is judged that the wheel tends to be locked and the anti-skid control is started. Other similar steps of the judgement or combination thereof can be used in the invention.

Also in connection with the judgement of the timing at which the pressure relieving state of the anti-skid control changes to the pressure re-increase state, conventional methods may be used. For example, the controller may judge that, when the slip rate or the quantity of slip comes below a predetermined threshold during the pressure relieving state, the tendency of locking of the wheel 1 is canceled and start the pressure re-increase. Alternatively, the controller 19 may judge that the tendency of locking of the wheel 1 is canceled and resume the anti-skid control when the deceleration of the wheel 1 comes below a predetermined threshold. Combination of these steps may also be used.

The novel part of the controller 19 will be described.

While the anti-skid control is being performed, it is judged from what is stored in a memory which of the states the control is in, a pressure relieving state in which the brake fluid pressure in the wheel cylinder is being reduced, retaining state in which the brake pressure is withheld, or a pressure re-increase state in which the brake pressure is increased again. When the control is in either of the pressure relieving state and the pressure retaining state, different steps suitable for these states are respectively achieved as is done in a conventional control. When the control is in the pressure re-increase state, judgement is made by the output signal from the wheel speed detector 20 to determine whether there is pulsatory change in the wheel speed.

When there is pulsatory change in the wheel speed, a control suitable for presence of pulsatory change is achieved as is done in a conventional method. When there is no pulsatory change, a sampling time is observed so that a wheel speed is determined for each sampling time to sample the wheel speed at a constant time interval. It is judged whether a sampling time is detected. When it is detected, the wheel speed $R\omega$ is stored in a "stack" way. Here, in this specification, a "stack" memory means such means having a plurality of memory areas for sequentially storing new data so that the oldest data in what is stored in the memory means is canceled when the newest data is stored. When a sample time is not detected, it is judged whether the wheel is in the zone in which the wheel changes from the acceleration state to the decelerating state or in the zone in which the wheel is consistently decelerated based on the wheel speed $R\omega$ which is determined by the signal from the wheel speed detector 20. When the wheel is in the zone in which it consistently decelerates, a conventional control is achieved. On the other hand, when the wheel is in the zone in which it changes from the acceleration state to the deceleration state, the rate of change k is calculated by the foregoing steps.

The controller 19 compares the value of the rate of change k calculated as noted above with a predetermined threshold and when it is below the threshold, the controller changes the anti-skid control from the pressure increase state to the pressure relieving state.

According to the anti-skid control apparatus which achieves the anti-skid control of the foregoing embodiment, the controller 19, while the anti-skid control is achieved, reduces the brake fluid pressure in the wheel cylinder 13 by means of the modulator 14 and thereafter re-increases it under certain conditions so that the braking torque increases linearly with respect to time. While the pressure is thus increased again, the controller calculates the rate of change k of the coefficient of road surface friction with respect to the wheel slip rate by achieving the steps of: obtaining the wheel speed $R\omega n_{+1}$ at a point of time $tn_{+1}$ which is the midpoint of a first point of time tn and the second point of time $tn_{+2}$ giving the same wheel speed, subtracting from this wheel speed $R\omega n_{+1}$ the wheel speed $R\omega n$ at the first point of time tn or $R\omega n_{+2}$ at the second point of time $tn_{+2}$, increasing by four times the result of subtraction $(R\omega n_{+1}-R\omega n)$ or $(R\omega n_{+1}-R\omega n_{+2})$ and dividing this increased result by the time period T between the first and second points of time tn and $tn_{+2}$, obtaining a reciprocal of the result of the division, subtracting from this reciprocal, a reciprocal of the wheel acceleration $R\omega n'$ at the first point of time tn, multiplying the result of subtraction with Q/(WoR) and the vehicle speed v, the former being attained by dividing the rate of increase Q of the braking torque at the midpoint $tn_{+1}$ by the product of the wheel load Wo and the effective wheel radius R, and then the result of the multiplication is increased by three times. The controller 19 re-relieves the brake fluid pressure through the modulator 14 when the rate of change comes below a predetermined threshold.

Therefore, in connection with calculation of the rate of change k of the coefficient of road surface friction relative to the wheel slip rate, the number of points of time at which the wheel speed should be detected for calculation can be reduced, thereby reducing the time used for process of calculation.

What is claimed is:

1. A method of anti-skid control in which the brake fluid pressure in a wheel cylinder is reduced and thereafter it is re-increased so that the braking torque including the braking system torque is linearly increased with respect to time due to the anti-skid control and the rate of change of the coefficient of road surface friction with respect to the wheel slip rate is determined while the brake fluid pressure is thus re-increased so that the brake fluid pressure is re-relieved when said rate of change comes below a predetermined threshold, said method calculating said rate of change by achieving, when there is no pulsatory change in the wheel speed during said re-increase of the brake fluid pressure, the steps of: obtaining the wheel speed at the point of time which is the midpoint of first and second points of time giving the same wheel speed, subtracting from this wheel speed at the midpoint the wheel speed at the first point of time or at the second point of time, increasing by four times the result of subtraction and dividing this increased result by the time period between the first and second points of time, obtaining a reciprocal of the result of the division, subtracting from this reciprocal, a reciprocal of the wheel acceleration at the first point of time, multiplying the result of the subtraction with the vehicle speed and a value which is attained by dividing the rate of increase of the braking torque at the midpoint by the product of the wheel load and the effective wheel radius, and then increasing the result of the multiplication by three times.

2. An apparatus for anti-skid control comprising a wheel speed detector for detecting the speed of a wheel, a modulator which can at least decrease or increase the brake fluid pressure in a wheel cylinder and a controller for controlling the operation of said modulator, said controller being adapted, by means of said modulator when an anti-skid control is achieved, to reduce the brake fluid pressure in said wheel cylinder and thereafter re-increases it under predetermined conditions so that the brake torque including the braking system torque is increased linearly with respect to time and also adapted to calculate the rate of change of the coefficient of the road surface friction with respect to the slip rate of the wheel by achieving, while the brake fluid is thus re-increased and when it is judged that there is no pulsatory change in the wheel speed, the steps of: obtaining the wheel speed at the point of time which is the midpoint of first and second points of time giving the same wheel speed, subtracting from this wheel speed at the midpoint the wheel speed at the first point of time or at the second point of time, increasing by four times the result of subtraction and dividing this increased result by the time period between the first and second points of time, obtaining a reciprocal of the result of the division, subtracting from this reciprocal, a reciprocal of the wheel acceleration at the first point of time, multiplying the result of the subtraction with the vehicle speed and a value which is attained by dividing the rate of increase of the braking torque at the midpoint by the product of the wheel load and the effective wheel radius, and then increasing the result of the multiplication by three times, said controller being also adapted to re-relieve the brake fluid pressure through said modulator when said rate of change comes below a predetermined threshold.

* * * * *